UNITED STATES PATENT OFFICE.

J. F. SHELDEN, OF VIOLA, ILLINOIS.

IMPROVED PROCESS OF MANUFACTURING SUGAR FROM SORGHUM.

Specification forming part of Letters Patent No. 40,954, dated December 15, 1863.

*To all whom it may concern:*

Be it known that I, J. F. SHELDEN, of Viola, in the county of Mercer and State of Illinois, have invented a new and useful Improvement in Process for Manufacturing Sugar from Sorghum Sirup or Molasses; and I hereby declare that the following is a full, clear, and exact description thereof.

The nature of my invention consists in a peculiar treatment of the cold sirup manufactured from sorghum and from other sacchariferous plants or canes whose sugar does not generally granulate with saleratus or soda or some equivalent alkaline substance, thereby causing the said sugar to granulate, and producing in much larger quantities than heretofore a superior article of sugar to any that has hitherto been obtained from sorghum by any other process.

To enable others skilled in the art to understand and make use of my improved process for manufacturing sugar, I will describe the same with particularity.

The sorghum sirup or molasses is first put into suitable vessels which are open at the top, so as to give free access to the air, and as the sirup during my treatment thereof is very easily flavored or impregnated with material of the cask or vessel containing it, care should be taken both to have the vessels clean and sweet, and also to havĕ the said vessels made of such material as possesses no distinct objectionable flavor or odor. Care should also be taken that no soured or acidulated sirup should be used, as soured sirup will not granulate or make sugar. To the sirup, when perfectly cold, I then add one pound of De Land's chemical saleratus for every twenty gallons thereof, and stir the whole thoroughly for about fifteen minutes to diffuse the saleratus equally throughout the mass. I consider the above-named brand of saleratus the best for the purpose; but any other suitable alkaline preparation may be used. The immediate effect of the saleratus upon the sirup is to cause it to effervesce and rise in the vessel. Hence, in filling it care should be taken to make allowance for this rising. After the sirup has begun to fall again it should be stirred thoroughly three times per day, or oftener, for from one to two weeks, by which time the granulation is generally completed. The molasses is then drained off and the sugar put into shallow open vessels, which are set in a dry, cool, and airy place, where the sugar is stirred frequently to expose it to the air and dry it off, which is sufficiently effected in about a month.

I am aware that saleratus has been used for cleansing sirup by applying it when the sirup is boiling or hot; but this does not produce the result which I am at at all.

By my process, which consists in applying the saleratus to the cold sirup, as described, from five to eight pounds of superior dry sugar may be manufactured from a gallon of sorghum sirup, which, without my treatment, will not ordinarily granulate in the least.

What I claim, and desire to secure by Letters Patent, is—

The process herein described of treating sorghum sirup when cold with saleratus or its equivalent in the manner and proportions herein set forth and described.

J. F. SHELDEN.

Witnesses:
   W. E. MARRS,
   L. L. COBURN.